United States Patent

Kawabata

[11] 4,062,488
[45] Dec. 13, 1977

[54] MECHANISMS FOR PRODUCING PRECISELY-TIMED INTERMITTENT OPERATIONS

[75] Inventor: Yousei Kawabata, Suwa, Japan

[73] Assignee: Kabushiki Kaisha Suwa Seikosha, Tokyo, Japan

[21] Appl. No.: 713,737

[22] Filed: Aug. 11, 1976

[30] Foreign Application Priority Data

Aug. 11, 1976 Japan .................................. 50-97385

[51] Int. Cl.² ............................................... G06K 1/10
[52] U.S. Cl. ..................................... 234/115; 234/130
[58] Field of Search ............... 234/115, 114, 119, 130, 234/128

[56] References Cited

U.S. PATENT DOCUMENTS

| | | | |
|---|---|---|---|
| 2,997,231 | 8/1961 | Perez | 234/119 |
| 2,998,913 | 9/1961 | Alonas | 234/115 |
| 3,100,599 | 8/1963 | Hebert | 234/115 |
| 3,915,373 | 10/1975 | Sogabe | 234/119 |

*Primary Examiner*—J. M. Meister
*Attorney, Agent, or Firm*—Blum, Moscovitz, Friedman & Kaplan

[57] ABSTRACT

A mechanism for achieving a precisely-timed intermittent operation includes an oscillating drive having continuously repeating oscillating cycles during which an output member of the oscillating drive oscillates back and forth between opposed dead center positions. A driven structure which has an input portion is provided for producing a predetermined intermittent operation. A motion-transmitting member has an operating position situated in the path of movement of the output member of the oscillating drive to be moved thereby, the input portion of the driven structure being situated in the path along which the motion-transmitting member is moved by the output member so that when the latter is in its operating positon a drive is transmitted from the output member through the motion-transmitting member to the driven structure to operate the latter. This motion-transmitting member has a retracted, rest position beyond the path of movement of the output member. A magnetic control is operatively connected with the motion-transmitting member for displacing the latter between its operating and rest positions, this magnetic control preferably displacing the motion-transmitting member to its operating position when the magnetic control is energized.

10 Claims, 7 Drawing Figures

MECHANISMS FOR PRODUCING PRECISELY-TIMED INTERMITTENT OPERATIONS

BACKGROUND OF THE INVENTION

The present invention relates to mechanisms capable of achieving a precisely-timed intermittent operation.

The structure of the invention is capable of being used, for example, on sheet material such as tapes or cards for the purpose of achieving punched tapes or punched cards.

In order to provide punched tapes or punched cards the sheet material, such as the tapes or cards, must be intermittently fed in such a way that it undergoes intermittent feeding movements which respectively alternate with dwell intervals during which the sheet material remains stationary.

While the sheet material is stationary it is acted upon by a reciprocating tool such as a punch. By restricting the operation of the reciprocating tool on the sheet material to the above dwell intervals thereof, it is possible for the tool to operate on stationary sheet material while feeding of the sheet material takes place during those intervals when the punch or other tool does not operate on the sheet material. In this way it is possible to both feed and punch the sheet material without any interference between these operations.

Conventional devices for achieving products such as punched sheet material generally include as their sources of power relatively large powerful magnets which must be precisely operated in suitable timed relationship for bringing about operations such as punching and feeding of sheet material.

Such conventional structures are undesirably large, so that they occupy too much space, they consume a relatively large amount of power, and because of factors such as friction and inertia of the components of such structures, it is difficult on the one hand to achieve the precise timed relationship which is required to prevent interference between operations such as feeding and punching, and if in fact such a desired time relationship is maintained, then the output is reduced inasmuch as the successive dwell and feed intervals of the sheet material cannot follow each other with the desired rapidity.

SUMMARY OF THE INVENTION

It is accordingly a primary object of the present invention to provide a structure which will avoid the above drawbacks.

In particular, it is an object of the present invention to provide a structure which can produce a product such as a punched tape or a punched card while at the same time being smaller and simpler than conventional structures for producing such products.

Furthermore, it is an object of the present invention to provide a structure of this type which will consume less power than conventional structures.

Also, it is an object of the present invention to provide a structure which will operate with a timing precision greater than that which has heretofore been possible while at the same time having a greater output than conventional structures.

Furthermore, it is an object of the present invention to provide a structure of the above type which has the capability of providing ease and convenience in the controls.

The structure of the invention includes, in a machine for performing on a sheet material such as tapes, cards, or the like, a plurality of operations which include as one operation at least intermittently feeding the sheet material in at least one direction, so that the sheet material undergoes feeding intervals during which the sheet material moves and dwell intervals which alternate with the feeding intervals and during which the sheet material remains stationary, and as another operation working on the sheet material with a reciprocating tool such as a punch, so as to achieve a product such as a punched tape or a punched card, a plurality of mechanisms for respectively performing these operations, each of these mechanisms comprising an oscillating drive means for providing an oscillating driving movement which has continuously repeating oscillating cycles all of which are identical, this oscillating drive means including an output member which oscillates along a predetermined path back and forth between opposed dead center positions during each oscillating cycle of the oscillating drive means. A driven means is provided for performing one of the above operations on the sheet material. A motion-transmitting means for transmitting motion from the oscillating drive means to the driven means has an operating position situated in the above path of movement of the output member of the oscillating drive means to be moved thereby along a predetermined motion-transmitting path. The driven means has an input portion situated at the latter motion-transmitting path to be engaged by the motion-transmitting means and move thereby for operating the driven means to perform an operation on the sheet material. This motion-transmitting means also has a retracted rest position situated beyond the predetermined path of the output member so that when the motion-transmitting means is in its retracted rest position the driven means is not operated while the oscillating drive means continuous to operate. A control means is operatively connected with the motion-transmitting means for displacing the latter between the operating and rest positions thereof for controlling when a drive is transmitted from the oscillating drive means through the motion-transmitting means to the driven means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
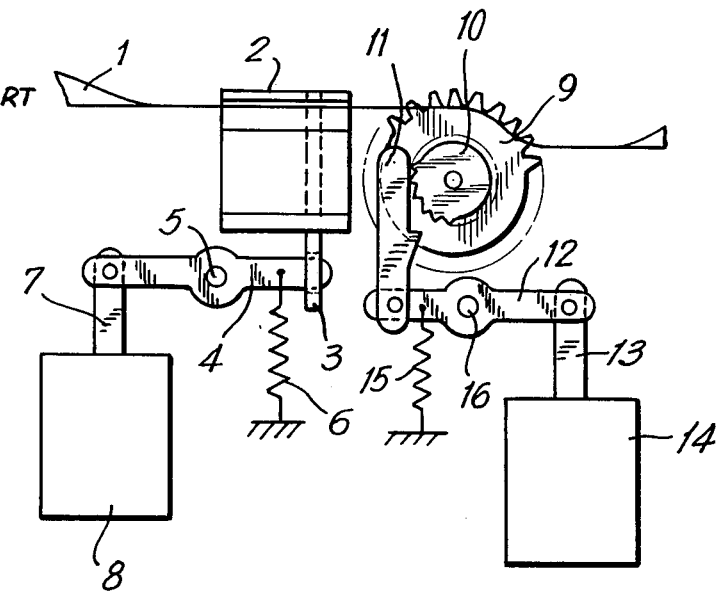
FIG. 1 is a schematic illustration of a prior art structure for achieving a product such as a punched tape.

Referring first to FIG. 1, there is shown therein an example of a conventional punching device. In the example of FIG. 1 there is shown a paper tape 1 which is in a known way guided for movement through a punch block 2 where the tape is punched by a reciprocating tool which in the illustrated example is a reciprocating punch 3. The reciprocating punch 3 is formed at its lower portion with a slot receiving a free end of a swingable lever 4 supported for swinging movement on a stationary pivot 5 and pivotally connected distant from the punch 3 to the armature 7 of a solenoid or magnet 8. A spring 6 is operatively connected with the lever 4 in order to lower the punch 3 to its rest position. Thus, when the magnet 8 is energized the armature 7 will be pulled down so as to raise the punch 3 in opposition to the spring 6 to bring about a punching stroke. When the magnet 8 is not energized the spring 6 will act to return the parts to their rest position.

FIG. 1 also shows a tape-feeding mechanism which includes a rotary sprocket 9 which in a known way has teeth extending into perforations of the tape 1.

The rotary sprocket 9 is coaxially fixed with a ratchet 10 which when turned through a given increment will provide a corresponding rotation of the sprocket 9 and a feeding of the tape 1. A pawl 11 cooperates with the ratchet 10 and is pivotally connected with a lever 12 which distant from the pawl 11 is pivotally connected with an armature 13 of an electromagnet 14. The lever 12 is supported for swinging movement by a stationary pin 16. A spring 15 acts on the lever 12 to releasably hold the parts in the rest position shown in FIG. 1. Thus, when the electromagnet 14 is energized, the armature 13 will be pulled down to raise the pawl 11 so that the tooth thereof will engage the ratchet 10 and turn the sprocket 9 to feed the tape. When the electromagnet 14 is not energized the spring 15 will return the parts to the position shown in FIG. 1.

Of course, the electromagnet 8 and 14 must be controlled in a suitably timed relation according to which when one of these electromagnets is energized the other is not energized. In this way it is possible to provide for a feeding movement of the tape when the punch 3 is in its rest position while the tape will be stationary when the punch 3 is raised.

The conventional structure which is shown in FIG. 1 has several drawbacks. In the first place, the electromagnets require a large amount of power, particularly by reason of the inefficiency with which the supplied energy is used. The electromagnets 8 and 14 must have a relatively large size, so that as a result the entire construction becomes large and complicated. Furthermore, a certain minimum time interval is required between operation of the magnet 14 for feeding the sheet material and operation of the magnet 8 for operating the punch. This relatively large time interval required between these operations is essential in order to make certain that the tape has completely stopped its movement when the punch operates and also in order to make certain that the punch is beyond the sheet material when the magnet 14 operates. Thus, a suitable timing circuit is essential in order to provide suitably timed signals to the electromagnets in order to properly time the intervals when the electromagnets are energized, and such a timing circuit also is relatively complex.

The structure of the invention described below avoids the drawbacks of the above example of a conventional structures as shown in FIG. 1 and described above.

Figure 2:
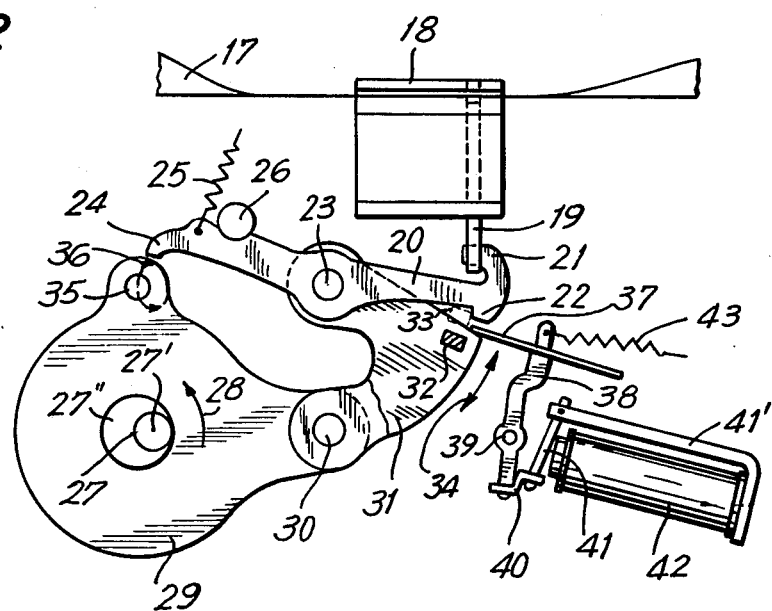
FIG. 2 is a fragmentary partly sectional schematic illustration of an embodiment of the invention for operating a punch.

FIG. 2 illustrates an embodiment of the invention for performing a punching operation on a sheet material such as the tape 17. The tape 17 is guided through a conventional punch block 18 in which the tape is punched during upward movement of the illustrated punch pin 19. At its lower end region, below the block 18, the punch pin 19 is formed with a slot which receives a free end 21 of a driven lever 20 which forms part of a driven means for carrying out a desired operation on the sheet material, this operation being punching of the sheet material 17 in the example illustrated in FIG. 1. The driven lever 20 is supported for turning movement by a pivot means 23 in the form of a suitable stationary pivot pin which has a stationary pivot axis about which the lever 20 can swing. At its right end, as viewed in FIG. 1, the driven lever 20 of the driven means has a projection 22 forming an input portion which receives the input drive by means of which the lever 20 is turned in a counterclockwise direction, as viewed in FIG. 1, about the axis of the pivot means 23.

At its end opposite from the input portion 22, the driven lever 20 has a reset portion 24 adapted to be acted upon for resetting the lever 20 to its rest position. In addition, a spring means 25 acts on the lever 20 for yieldably urging the latter to the illustrated rest position where the driven lever 20 engages a stop means in the form of a stationary stop pin 26.

The mechanism of FIG. 2 includes an oscillating drive means, and this oscillating drive means includes the continuously rotating eccentric shaft 27 which is continuously driven at a constant speed by any suitable motor and transmission or the like about an axis 27'. The rotary shaft 27 has the eccentric portion 27" which is received by way of a suitable bearing in an opening of a connecting means 29, the constantly rotating shaft 27 rotating in the direction of the arrow 28 for providing through the eccentric portion 27" an oscillating movement for the connecting means 29.

The oscillating drive means further includes a rock lever having a pair of identically shaped lever arms 31 also supported for movement about the stationary pivot axis of the pivot means 23, these identical arms 31 of the rock lever being spaced from each other so that the driven lever 20 of the driven means can extend freely between these arms 31. The lower ends of the arms 31 also receive between themselves the right free end portion of the connecting means 29 which is connected with the lower ends of the arms 31 by way of a pivot pin 30, so that during rotation of the shaft 27 the rock lever 31 will be oscillated back and forth about the axis of the pivot means 23 as indicated by the arrow 34.

This oscillating drive means includes an output member 32 in the form of a relatively short rigid block extending between and fixed to the arms 31 of the rock lever. The rotary shaft means 27 of the oscillating drive means rotates at a constant speed and provides for the oscillating drive means an oscillating movement having constantly repeating oscillating cycles all of which are identical, and during each of these cycles the output member 32 moves from the lower dead center position shown in solid lines in FIG. 1 up to the upper dead center position 33 indicated in phantom lines and then back to the lower dead center position, so that during each cycle the output member 32 moves along a predetermined path between the opposed dead center positions as illustrated in solid and phantom lines in FIG. 1. During this movement between the illustrated opposed dead center positions the output member 32 of course turns about the axis of the pivot means 23.

The connecting means 29 of the oscillating drive means carries at its upper region, as viewed in FIG. 2, a resetting means 35 in the form of a pin which projects from the plate 29. During rotation of the shaft 27 the resetting pin 35 carries out a movement through the path 36 illustrated in FIG. 2. During the time when the parts have the position shown in FIG. 2, the pin 35 does not engage the end 24 of the driven lever 20.

With the structure of FIG. 2 as thusfar described above, the driven means which includes the lever 20 will remain in the illustrated rest position while the shaft 27 continues to rotate and while the oscillating drive means continues to operate repeatedly through the identical oscillating cycles during which the output member 32 moves between its opposed dead center positions. In order to transmit movement from the oscillating drive means to the driven means, a motion-transmitting means is provided, and this motion-transmitting means includes a motion-transmitting member 37 in the form of an elongated relatively rigid plate or strip made of any suitable metal or plastic and capable of being displaced between the illustrated retracted rest position thereof shown in FIG. 1 to an operating position where the left free end portion of the motion-transmitting member 37 is situated in the gap which is defined between the input portion 22 of the driven lever 20 and the output member 32 when the latter is in its lower dead center position shown in FIG. 2. It will be noted that when the motion-transmitting member is in its retracted rest position shown in FIG. 2, the left free end thereof is adjacent but beyond the oscillating path of movement of the output member 32, this left free and of member 37 being situated substantially midway between the opposed dead center positions or in other words beside but adjacent the central point of the path of travel of the output member 32.

Figure 2A:
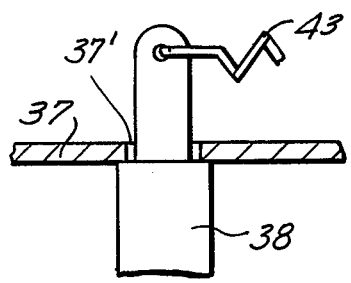
FIG. 2A is a fragmentary partly sectional illustration of part of a motion-transmitting means of the structure of FIG. 2.

As is indicated most clearly in FIG. 2A, the elongated motion-transmitting member 37 is formed with a relatively short longitudinal slot 37' through which extends the upper relatively narrow end of an elongated lever 38 of the motion-transmitting means, so that the member 37 can simply rest on the shoulders defined between the wider and narrower portions of the lever 38, as is most clearly apparent from FIG. 2A. Of course the length of the slot 37 is shorter than the width of the lever 38 below the member 37.

Figure 2B:
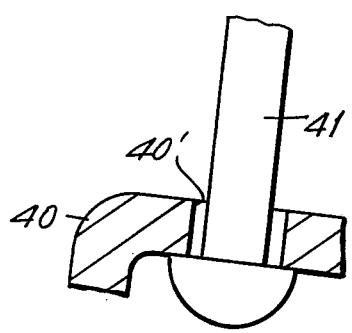
FIG. 2B is a fragmentary partly sectional illustration of the connection between a control means and the motiontransmitting means of FIG. 2.

This lever 38 is supported intermediate its ends for swinging movement by a stationary pivot 39, and at its lower end the lever 38 also has a relatively narrow portion extending through a slot formed in the lower end of a cranked member 40 which at its upper end is formed with a slot receiving an elongated member 41, in the manner shown most clearly in FIG. 2B. This elongated member 41 is an armature of an electromagnet and has a lower enlarged free end longer than the slot 40' of the member 40 through which the armature 41 freely extends. In this way the member 40 is carried by the armature 41. This armature 41 extends at its upper end region through a slot or notch formed in the upper left free end portion of a stationary substantially L-shaped member 41', this member 41' carrying a pivot pin which extends across the slot or notch thereof and through the upper end of the armature 41 so that in this way the armature 41 is supported for free swinging movement. The support 41' carries the electromagnet 42 which when energized will attract the armature 41 to swing the latter in a counterclockwise direction outwardly toward the right, as viewed in FIG. 1, thus causing the armature 41 to act through the cranked member 40 on the lever 38 to turn the latter also in a counterclockwise direction, and in this way the motion-transmitting member 37 will be advanced toward the left, as viewed in FIG. 2, into and through the gap between the input portion 22 of the driven lever 20 and the output member 32 when the latter is in its lower dead center position. The control means for the motion-transmitting means formed by elements 37 and 38 and interconnected by way of element 42 the magnetic means 41, 42 of the control means further includes a spring 43 connected with the upper end of the lever 38 in the manner schematically shown in FIG. 2, and acting to return the parts to the rest position shown in FIG. 2 when the magnetic means 41, 42 is not energized.

When it is desired to carry out a punching operation with the above-described structure of FIG. 2, a suitable unillustrated sensing device which senses automatically the angular position of the eccentric portion 27" operates to automatically energize the electromagnet 42 when the output member 32 is at its lower dead center position, so that at this instant the armature 41 is attracted and the motion-transmitting member 37 is displaced from the rest position thereof shown in FIG. 2 toward the left through the gap between input portion 22 and output member 32 so as to locate the output member 32 and the input portion 22 respectively on opposite sides of the motion-transmitting member 37. Then, during the continued rotation of the shaft 27, which continuously rotates at a constant speed as pointed out above, the output member 32 will turn upwardly toward its upper dead center position 33, but now this output member 32 will displace the motion-transmitting member 37 which engages the input portion 22, so that as a result at this time the driven means will be operated with the lever 20 thereof turning in a counterclockwise direction about the pivot 23, as viewed in FIG. 2, so that the punch 19 is displaced upwardly to carry out a punching operation. Simultaneously with this upward movement of the output member 32, the resetting means 35 moves downwardly, and thus there is no danger that the downwardly moving end 24 of the lever 20 will engage the reset pin 35. However, during the continued rotation of the shaft 27, when the output member 32 starts to move down from its upper dead center position 33 the pin 35 moves upwardly so that now the reset means 35 will engage the end 24 of the lever 20 to contribute together with the spring 25 to return of the driven lever 20 to its rest position in engagement with the stop means 26. Of course, when the output member 32 has reached its upper dead center position 33 the electromagnet 42 has become deenergized, and the spring 43 has returned the motion-transmitting means to its rest position where the motion-transmitting member 37 is situated beyond the path of movement of the output member 32.

Figure 3:
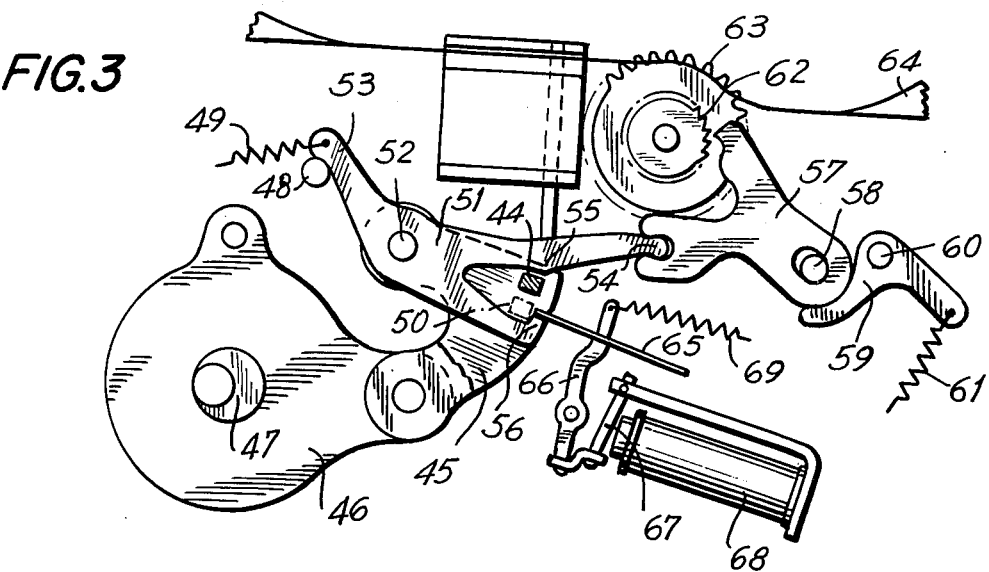
FIG. 3 is a schematic illustration of another mechanism of the invention, the mechanism of FIG. 3 being utilized to feed sheet material.

Situated directly in front of and adjacent the above-described punching mechanism of FIG. 2 is a tape-feeding mechanism which is shown in FIG. 3. This tape-feeding mechanism includes an output member 44 which operates in the same way as the output member 32 and which moves between the upper dead center position shown in solid lines in FIG. 3 and the lower dead center position 50 shown in phantom lines in FIG. 3. This output member 44 is in the form of a block extending between and fixed to a pair of arms of a rock lever 45 which is identical with the rock lever 31.

In the same way, the lower end of the rock lever 45 of FIG. 3 is pivotally connected with a connecting means 46 identical with the connecting means 29 and driven in the same way by way of a rotary shaft means 47 having an eccentric portion. Thus, the oscillating drive means of FIG. 3 is identical with that of FIG. 2. The rock lever 45 is supported for swinging movement about a stationary pivot axis provided by a stationary pivot pin 52.

The driven means of FIG. 3 is however different from that shown in FIG. 2. This driven means also includes a driven lever 51 supported by the pivot means 52 and extending between the pair of arms of the rock lever 45 in the same way that the lever 21 extends between the arms of the rock lever 31. The lever 51 has a left free end portion 53 urged by a spring 49 against the stop means 48 which thus determines the rest position of the driven lever 51 of the embodiment of FIG. 3.

Distant from its end 53 the driven lever 51 has a curved free end portion 54 received in a notch of a pawl 57 which cooperates with the ratchet 62 in a manner described below.

It will be seen that in the embodiment of FIG. 3 the driven lever 51 is formed with a notch in which the output member 44 is situated for free oscillating movement between the upper and lower dead center positions illustrated without engaging the lever 51 when the latter is in its illustrated rest position. At the upper right end region of this notch the lever 51 has a reset portion 55 acted upon by the output member 44 which contributes to the return of the lever 51 to its rest position in the same way as the resetting means 35. The lower right end region of this notch which is formed at the lever 51 carries the projection 56 which forms the input portion of the driven means of the embodiment of FIG. 3.

Thus, it will be seen that the pivot means 52 corresponds to the pivot means 23 while the shaft 47 corresponds to the shaft 27, and in fact this pair of pivot means and shafts may form portions of a common pivot and shaft with the structures of FIGS. 2 and 3 being situated one beside the other as set forth above.

The driven means includes in addition to the driven lever 51 the pawl 57 which responds to turning of the lever 51, this pawl 57 having an elongated slot through which extends a pivot 58 for supporting the pawl 57 for swinging movement as well as for slight longitudinal movement. The pawl 57 terminates at its upper left end portion with a tooth capable of engaging a tooth of the ratchet 62 which is fixed coaxially with the sprocket 63 so that when the ratchet 62 is turned the sprocket 63 will also turn in order to feed the tape 64 toward the right, as viewed in FIG. 3, this tape 63 of course corresponding to the tape 17 and may in fact be the same tape 17.

A lever 59 engages the right free end portion of the pawl 57, this lever 59 being turnable about a stationary pivot 60 and being acted upon by the spring 61 so as to urge the pawl 57 upwardly toward the left, as viewed in FIG. 3. However, as required during the operation of the pawl, it is free to move in opposition to the spring 61 downwardly toward the right to a relatively small extent.

Thus, by way of the spring 61 and the lever 59 the tooth of the pawl 57 is maintained in a proper position for engaging a tooth of the ratchet 62 when the lever 51 is turned in a counterclockwise direction, as viewed in FIG. 3, about the pivot 52.

The embodiment of FIG. 3 includes a motion-transmitting means as well as a control means which are identical with the corresponding components of FIG. 2. Thus the motion-transmitting means of FIG. 3 includes the elongated motion-transmitting member 65 which may be identical with the member 37 and which is in the same way by a lever 66 identical with the lever 38, this lever 66 being supported for pivotal movement in the same way as described above in connection with FIG. 2 and also being operatively connected in the same way with the armature 67 of the electromagnet 68, this armature and electromagnet corresponding to and being identical with the armature 41 and the electromagnet 42. A spring 69 also is provided in FIG. 3 and corresponds to the spring 43 for retracting the motion-transmitting means of FIG. 3 to its rest position where the left free end of the member 65 is situated beyond the path of oscillating movement of the output member 44.

With the construction of FIG. 3, when the shaft 47 is in the position shown in FIG. 3, which it will be noted is 180° out of phase with the position of the shaft 27 shown in FIG. 2, the eccentric portion of the shaft 47 will create a signal for energizing the electromagnet 68 so that the member 65 will now be displaced toward the left, as viewed in FIG. 3, through the gap between the output member 44 which now is in its upper dead center position and the input portion 56 of the driven lever 51, so that now during the next downward movement of the output member 44 the latter will act on the motion-transmitting member 65 to transmit motion to the input portion 56 of lever 51 so as to turn the latter in a clockwise direction, as viewed in FIG. 3, thus causing the pawl 57 to turn in a counterclockwise direction about the pivot 58 and bringing about a feeding movement of the tape 64.

It will be noted that because the operations of the mechanisms of FIGS. 2 and 3 are 180° out of phase with each other, the tape will be stopped when the punching operation takes place and the punch will be in its rest position when the feeding operation takes place.

Thus, with the electromagnet 68 energized, the continued rotation of the shaft 47 beyond the position shown in FIG. 3 will result in downward movement of the output member 44 to provide for clockwise turning of the lever 51 as pointed out above. As the ratchet 62 turns in a clockwise direction, as viewed in FIG. 3, during a feeding interval, the pawl 57 will not only turn in a counterclockwise direction about the pivot 58, but in addition it will be displaced slightly downwardly toward the right, as viewed in FIG. 3, in opposition to the spring 61.

After the ratchet 62 has been turned, for example, through an angular increment occupied by one tooth thereof, the feeding operation has been completed, and the output member 44 has reached its lower dead center position 50, with automatic deenergizing of the magnet 68 having been provided at this time so that the motion-transmitting member 65 is retracted to its rest position during the upward return movement of the output member 44 which contributes toward resetting of the lever 51 as described above. This return of the lever 51 to its rest position of course results in clockwise turning of the pawl 57, as viewed in FIG. 3, back to the rest position of the pawl. Thus, in the manner described above the parts are returned to their initial positions at the end of the tape-feeding operation.

Figure 4:
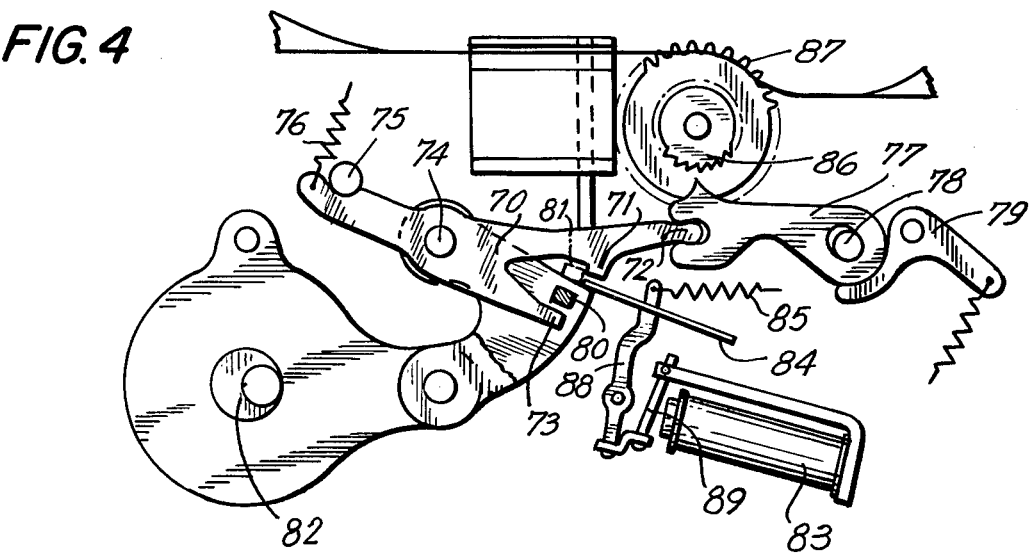
FIG. 4 is a schematic illustration of a structure similar to that of FIG. 3 but utilized to feed the sheet material in a direction which is the reverse of that of FIG. 3.

FIG. 4 illustrates a mechanism of the invention for feeding a tape in the direction which is the reverse of that of FIG. 3. In FIG. 4 the driven means includes the driven lever 70 which corresponds to the lever 51 and which is supported in the same way for swinging movement about a pivot means 74 which has a stationary pivot axis. This driven lever 70 has a curved free end portion 72 extending into a notch of a pawl 77 which corresponds to the pawl 57. The lever 70 also is formed with a notch having at one end region a resetting portion 73 situated adjacent the lower dead center position of an output member 80 of an oscillating drive means identical with the oscillating drive means of FIGS. 2 and 3. The end region of the notch of lever 70 which is opposite from the resetting portion 73 carries the input portion 71 cooperating with the motion-transmitting member 84. The output member 80 oscillates between the lower dead center position shown in solid lines in FIG. 4 and the upper dead center position 81 shown in phantom lines. The end of lever 70 distant from its end 72 is connected with a return spring 76 which yieldably maintains the lever 70 in engagement with a stop means 75 which determines the rest position of the lever 70.

The mechanism of FIG. 4 is also situated in alignment with and next to the mechanism of FIGS. 2 and 3, for example with the mechanism of FIG. 3 being situated between the mechanism of FIG. 2 and that of FIG. 4.

The pawl 77 has a tooth which cooperates with a ratchet 86 fixed coaxially with a sprocket 87 so as to turn the latter about a stationary axis for feeding the tape toward the left, as viewed in FIG. 4. This pawl 77 also has an elongated opening through which a stationary pivot 78 extends with a lever 79 being acted upon by a spring so as to perform the same operation as the lever 59.

It will be seen that the oscillating drive means of the embodiment of FIG. 4, while being identical with the oscillating drive means of FIGS. 2 and 3 has its eccentric shaft 82 angularly oriented so as to be phase with the shaft 27. Thus the output member 80 will operate in the same way as the output member 32, but during the return feeding of the tape the magnet 42 is maintained unenergized inasmuch as no punching operations are carried out during the return feeding of the tape, so that there will be no interference between the punching operations and the return feeding operations even though the eccentric portion of shaft 82 is in phase with the eccentric portion of the shaft 27.

The motion-transmitting means of FIG. 4 is identical with that of FIGS. 2 and 3, and includes the lever 88 corresponding to the levers 38 and 66 as well as the motion-transmitting member 84 corrsponding to the members 37 and 65 and supported by the lever 88 in the same way that the member 37 is supported by the lever 38. A spring 85 is connected to the lever 88 to return the motion-transmitting means to its rest position, and the electromagnet 83 is energized to attract the armature 89 so as to displace the motion-transmitting member 84 into the gap between the input portion 71 of driven lever 70 and the output member 80 when the latter is in its relative center position shown in FIG. 4.

With the embodiment of FIG. 4 the energizing of the electromagnet 83 is carried out in snychronism and properly timed relation with the rotation of the shaft 82 so that energizing of magnet 83 takes place when output member 80 is at its bottom dead center position. The continued rotation of the shaft 82 will result in upward movement of the member 80 so that now motion will be transmitted through the motion-transmitting member 84 to the input portion 71 of the lever 70 to turn the latter and bring about a reverse feeding of the tape. While the toothed pawl 77 engages ratchet 86 the pawl 77 is free to move in opposition to the spring acting on lever 79. Thus, at this time the feeding of the tape in a reverse direction will take place until member 80 reaches its upper dead center position 81. However, during continued turning of eccentric shaft 82 when the output member 80 starts to move downwardly from its top dead center position, the electromagnet 83 is unenergized while the downwardly moving member 80 engages the reset portion 73 of lever 70 to contribute to the return thereof of the rest position. Of course, the pawl 77 will now be returned to its rest position.

It is to be noted in connection with FIG. 2, that a pair of straight lines which intersect at the axis 27' of shaft 27 and which respectively pass through the resetting pin 35 and the connecting pin 30 are perpendicular to each other, so that the resetting operation provided by way of the pin 35 and the driving of the pin 30 are 90° out of phase with respect to each other. Thus, as contrasted with the movement of the output member 32, the movement of the reset pin 35 is 90° out of phase, this pin 35 moving with a phase lag of about 90° with respect to the output member 32. Thus there is a phase lag of 90° between the punching action and returning action of the punch-operating lever 20.

As was pointed out above in connection with FIGS. 2 and 3, the punching operation of FIG. 2 and the tape-feeding operation of FIG. 3 are carried out in such a way that there is phase lag of 180° between these operations. Thus, in connection with FIG. 2, after output member 32 engages the motion-transmitting member 37 at approximately the center of the path of movement of member 32 from its lower dead center position toward its upper dead center position, the shaft 27 continues to rotate through 90° in order to bring about a punching operation and then rotates through an additional 90° to bring about the setting of the driven lever 20 by way of the pin 35. Then the eccentric shaft will turn through a further 90° before a tape-feeding action is initiated. Thus, after the punch pin 19 completes its punching operation and returns to its rest position so as to be free from the tapes, tape-feeding is completed so that the punch pin is never in engagement with the tape during the feeding thereof. Of course, as pointed out above in connection with FIG. 4, although the tapes are fed during upward movement of the output member 80 of FIG. 4, and the action of the mechanism of FIG. 4 takes place in the same way as the action of the mechanism of FIG. 2, the mechanism of FIG. 2 remains stationary during reverse feeding of the tape so that there is no problem in connection with any interference between a possible punching action and a reverse feeding action.

Figure 5:
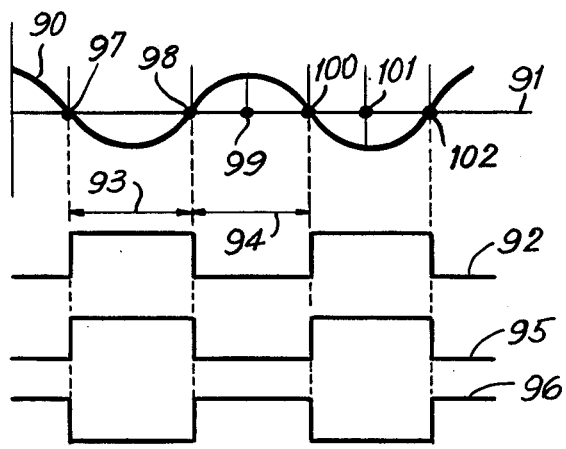
FIG. 5 is a diagram illustrating the timed relationship between the operation of various of the components of the structure of the invention.

The timing relationship of the various mechanisms referred to above is diagrammatically illustrated in FIG. 5. Thus, at the upper part of FIG. 5 the curve 90 represents, for example, the oscillatory movement of the output member 32 of the oscillating drive means of FIG. 2. This curve 90 is a sine wave which is graphically represented in FIG. 5 with respect to a horizontal time axis 91. The successive crests of the curve 90 represent the opposed dead center positions of the output member 32, and the points such as the points 97 and 98 where the time axis 91 intersects the curve 90 represent the midpoints in the path of travel of the output member between its opposed dead center positions. The curve 92 represents the timing signal which can be obtained in any suitable manner such as by detecting the rotation of the eccentric portion of the drive shaft. For example, the drive shaft may carry a projection or use may be made of the eccentric portion itself in such a way that this projection or eccentric portion intersects a light beam of a photocell when the shaft is in a given angular position, and in this way a signal can be derived in synchronism with the angular rotation of the drive shaft. According to the curve 92, the signal which energizes the electromagnet is provided at the higher parts of the curve 92 which coincide with the portions of the curve 90 which are below the axis 91, whereas the lower portions of the curve 92 correspond with the upper parts of the curve 90, which are above the axis 91, and these lower portions of the curve 92 represent times when the electromagnet is not energized. The time spans 93 and 94 correspond to a complete oscillating cycle of the output member with each of these time spans corresponding to one-half of an oscillating cycle when the output member moves from a point midway between its dead center positions toward one of the dead center positions and then back to the center position. The time span 93 corresponds to an interval when the electromagnet is energized while the time span 94 corresponds to an interval when the electromagnet is not energized. The time signal 95 is identical with the time signal 92 and represents the timing of the electromagnet 42 of the mechanism of FIG. 2. However, this timing signal 95 of FIG. 5 will also be considered as representing a suitable timing signal for the electromagnet 83 of the mechanism of FIG. 4 which provides the reverse feeding. The time signal 96 shown in FIG. 5 is the reverse of the signal 95, being 180° out of phase with respect thereto, and this signal 96 is used for energizing the electromagnet 68 which brings about the tape feeding with the embodiment of FIG. 3.

When a signal is derived from the rotating eccentric shaft to carry out a punching operation, the electromagnet 42 will be energized commencing at the point 97 in FIG. 5 and continuing up to the point 98. During this interval the output member 32 travels from a point midway between its dead center positions down to its lower dead center position and then back to its position midway between the dead center positions, so that by the time that the output member 32 moves upwardly from its lower dead center position shown in FIG. 2 to a point midway between the lower and upper dead center positions, the energized electromagnet 42 has had sufficient opportunity to situate the motion-transmitting member 37 in the path of movement of the upwardly moving output member 32. From the point 98 to the point 99 shown in FIG. 5, although the signal for deenergizing the electromagnet 42 has already been given, nevertheless due to the inertia of the parts and due to the fact that the member 37 is gripped between the output member 32 and the input portion 22, this member 37 remains in its motion-transmitting position while the output member 32 travels to its top dead center position represented by the point 99 in FIG. 5. Then, during the next 90° of rotation of the eccentric shaft means, while the output member 32 returns from its top dead center position toward the point midway between its dead center positions, the spring 43 acts to retract the member 37 and the output member 32 reaches the latter midpoint between its dead center positions represented by the point 100 in FIG. 5. Of course, simultaneously with the retraction of the motion-transmitting means from the point 99 to the point 100 in FIG. 5 the punch pin 19 also returns to its rest position out of engagement with the tape. Thus, through a timing operation as described above and shown in FIG. 5 it is possible to provide electrical signals slightly in advance of the actual mechanical movements of the parts, thus compensating for inertia of the components and at the same time achieving an extremely rapid operation in a highly reliable manner. Thus, by the time that the output member 32 reaches its top dead center position shown in FIG. 2, the deenergizing signal for deenergizing the electromagnet 42 has been in existence for one-quarter of a revolution of the eccentric shaft and at the instant when the member 32 reaches its top dead center position the electromagnet is completely deenergized and the spring 43 is free to retract member 37 during the next quarter of a revolution of the eccentric shaft means while the output member 32 moves downwardly from its top dead center position to the point midway between its dead center positions, corresponding to the point 100 shown in FIG. 5.

Of course, in the meantime, during the time span 94 not only has the electromagnet 42 been deenergized but at the same time the signal for energizing the electromagnet 68 has been provided with the actual tape feeding taking place from the point 100 to the point 101 in FIG. 5 and with the return of the motion-transmitting member 56 of FIG. 3 taking place between the points 101 and 102, this operation being the same as that of FIG. 2 except that it is out of phase therewith as pointed out above.

With respect to the reverse feeding of FIG. 4, this is brought about also by a timing signal such as signal 95, with the electromagnet 83 being energized during the interval from the point 97 to the point 98 while the reverse feeding action is performed between the point 98 and 99 and the return of the reverse feeding mechanism takes place between the point 100 and 101.

It will be apparent from the above description that with the structure of the invention an efficient motor is used as a power source while a relatively inefficient electromagnet is used only in connection with control of the relatively small light motion-transmitting member so that the electromagnet can be of an extremely small size bringing about a miniaturization of the entire mechanism and a low power consumption. The tape feeding mechanism and the punching mechanism are situated side by side, arranged as shown in FIGS. 2–4, and a common motor may be used as a power source with all of the various motion-transmitting mechanisms having identical constructions and situated one beside the next so that the entire assembly can be simplified and rendered extremely compact as well as small in size. In addition, because there are three types of controls including punching, tape-feeding, and reverse tape feeding, all of which can be achieved by a single timing signal, it is possible to detect the angular rotation of the eccentric shaft for achieving this signal, so that the control signals can be provided in an extremely simple manner.

What is claimed is:

1. In a machine for performing on a sheet material such as tapes, cards, or the like, a plurality of operations which include as one operation at least intermittently feeding the sheet material in at least one direction, so that the sheet material undergoes feeding intervals during which the sheet material moves and dwell intervals which alternate with said feeding intervals and during which the sheet material remains stationary, and another operation working on the sheet material with a reciprocating tool such as a punch during dwell intervals of said feeding operation when said sheet remains stationary, so as to achieve a product such as punched tape or a punched card, a plurality of mechanisms for respectively performing said operations, each of said mechanisms comprising an oscillating drive means for providing an oscillating driving movement having continuously repeating oscillating cycles all of which are identical so that said operations of working on the sheet material and intermittent feeding intervals during which said sheet material moves are completed during the same oscillating cycle, said oscillating drive means including an output member which oscillates along a predetermined path back and forth between opposed dead center positions during each oscillating cycle of said oscillating drive means, driven means for performing one of said operations on said sheet material in response to being displaced from a rest position to an operating postion, motion-transmitting means for transmitting motion from said oscillating drive means to said driven means, said motion-transmitting means having an operating position situated in said path of movement of said output member to be moved thereby along a predetermined motion-transmitting path, and said driven means having an input portion situated at said motion-transmitting path to be engaged by said motion-transmitting means and moved thereby for operating said driven means from a rest position to an operating position to perform one of said operations on the sheet material, said motion-transmitting means also having a retracted rest position situated beyond said predetermined path of said output member so that when said motion-transmitting means is in said retracted rest position thereof said driven means is not operated and remains in a rest position while said oscillating drive means continues to operate, control means operatively connected with said motion-transmitting means for displacing the latter between said operating and rest positions thereof for controlling when a drive is transmitted from said oscillating drive means through said motion-transmitting means to said driven means, said oscillating drive means including resetting means for engaging said driven lever during each oscillating cycle that said driven means performs an operation on the sheet material, to thereby return said driven means to said rest position during said oscillating cycle that said driven means performs said operation on the sheet material.

2. The combination of claim 1 and wherein said control means includes a magnetic moving means operatively connected with said motion-transmitting means for displacing the latter from said rest position to said operating position thereof when said magnetic moving means is energized.

3. The combination of claim 2 and wherein said control means includes a spring means for retracting said motion-transmitting means to said rest position thereof when said magnetic moving means is not energized.

4. The combination of claim 1 and wherein said driven means includes a pivot means having a stationary pivot axis, a driven lever carrying said input portion of said driven means and supported by said pivot means for swinging movement about said pivot axis, said output member defining at one of its dead center positions a gap with said input portion of said driven lever, said motion-transmitting means being situated beyond said gap when in said retracted rest position thereof and said control means displacing said motion-transmitting means into said gap when said motion-transmitting means is displaced by said control means to said operating position thereof, said output member of said oscillating drive means and said input portion of said driven means being respectively situated on opposite sides of said motion-transmitting means when the latter is in said operating position thereof situated in said gap, so that when said output member moves from said one to said other dead center position thereof said output member will move said motion-transmitting means and the latter will engage said input portion and swing said driven lever about said pivot axis, said driven means performing an operation on the sheet material in response to swinging of said driven lever by said motion-transmitting means.

5. The combination of claim 4 and wherein said control means is operatively connected with said motion-transmitting means for returning the latter to said retracted rest position thereof before said output member returns to said one dead center position thereof, stop means for engaging said driven lever to determine said rest position thereof, and spring means operatively connected with said driven lever for yieldably maintaining the latter in engagement with said stop means, said motion-transmitting means when acting on said input portion of said driven lever displacing the latter in opposition to said spring means away from said stop means so that when said motion-transmitting means is returned by said control means to said retracted rest position thereof said spring means in combination with said resetting means acts to return said driven lever into engagement with said stop means.

6. The combination of claim 5 and wherein said driven lever is formed with a notch in which said output member oscillates without engaging said driven lever when the latter is in said rest position thereof, said notch having at one end region said input portion of said driven lever and an opposed end region situated adjacent said output member where the latter is in said one dead center position thereof, so that upon retraction of said motion-transmitting means to said rest position thereof said output member cooperates with said opposed end region of said notch of said driven lever for contributing to the return movement of said driven lever to said rest position thereof.

7. The combination of claim 4 and wherein said oscillating drive means includes a rock lever also supported by said pivot means for swinging oscillating movement about said pivot axis, said rock lever carrying said output member of said oscillating drive means, and said oscillating drive means further including a rotary drive shaft having an eccentric portion, and connecting means formed with an opening receiving said eccentric portion of said rotary drive shaft to be oscillated thereby, said connecting means being pivotally connected with said rock lever for rocking the latter back and forth about said pivot axis during rotation of said shaft.

8. The combination of claim 7 and including a least two of said mechanisms, one of said mechanism being a punch mechanism and the other of said mechanisms being a feed mechanism, said punch mechanism including a punch operatively connected with said driven lever to be operated thereby while said feed mechanism includes a rotary sprocket means engaging the sheet material, a ratchet coaxial with said rotary sprocket means, and a pawl means operatively connected with said driven lever to be operated thereby and cooperating with said ratchet for acting thereon during transmission of motion to said input portion of said driven lever of said feed mechanism from said output member through said motion-transmitting means.

9. The combination of claim 7 and wherein said mechanism is a feed mechanism for feeding sheet material, and said feed mechanism including a rotary sprocket engaging the sheet material, a ratchet coaxial with said sprocket, and pawl means operatively connected with said driven lever to be operated thereby and engaging said ratchet to turn said sprocket through a given increment when motion is transmitted from said output member through said motion-transmitting means to said input portion of said driven lever.

10. The combination of claim 4 and wherein said oscillating drive means inludes a rock lever supported also by said pivot means for swinging movement about said pivot axis, said rock lever carrying said output member, a rotary drive shaft and an eccentric portion fixed to said rotary drive shaft for rotation therewith, and connecting means formed with an opening receiving said eccentric portion of said rotary drive shaft to be oscillated thereby, said connecting means having a pivotal connection with said rock lever for rocking the latter back and forth about said pivot axis during rotation of said shaft, and said connecting means also carrying said resetting means for engaging said driven lever to reset the latter to a rest position thereof, a pair of lines which are perpendicular with respect to each other and which intersect at the axis of rotation of said rotary shaft respectively extending through said resetting means and said pivotal connection of said connecting means to said rock lever so that locking movement of said rock lever and operation of said resetting means are about 90° out of phase with each other.

* * * * *